United States Patent [19]

Kutnyak et al.

[11] 4,196,755
[45] Apr. 8, 1980

[54] REINFORCED FLEXIBLE DUCT WITH INTEGRAL MOLDED LINER

[75] Inventors: Thomas A. Kutnyak, Greenwood; Marvin A. Koerber, Abbeville, both of S.C.

[73] Assignee: Automation Industries, Inc., Greenwich, Conn.

[21] Appl. No.: 834,165

[22] Filed: Sep. 19, 1977

[51] Int. Cl.² .................. F16L 11/08; F16L 11/12
[52] U.S. Cl. ............................. 138/150; 138/125; 138/127; 138/129; 138/122; 138/133; 138/154; 138/174
[58] Field of Search ............... 138/122, 126, 129, 132, 138/144, 127, 150, 154, 138, 172, 174, 125

[56] References Cited

U.S. PATENT DOCUMENTS

| 1,974,285 | 9/1934 | Maclachlan | 138/122 X |
| 2,748,805 | 6/1956 | Winstead | 138/144 |
| 2,884,957 | 5/1959 | Happis et al. | 138/122 |
| 3,047,026 | 7/1962 | Kahn | 138/122 |
| 3,275,038 | 9/1966 | Roberts et al. | 138/122 |
| 3,548,882 | 12/1970 | Rinker | 138/150 X |
| 3,554,237 | 1/1971 | Pelley et al. | 138/144 X |
| 3,916,953 | 11/1975 | Nagayoshi et al. | 138/129 |

FOREIGN PATENT DOCUMENTS 230062 2/1959 Australia .................................. 138/150

Primary Examiner—Richard E. Aegerter
Assistant Examiner—James E. Bryant, III
Attorney, Agent, or Firm—Thomas L. Flattery

[57] ABSTRACT

The reinforced flexible duct consists of a single- or double-ply reinforcing fabric, a wire helix, and a continuous extruded liner. The fabric, wire helix, and extruded liner are continuously helically wound on a mandrel. The freshly extruded liner adheres to itself, to the helically wound wire, and to the reinforcing fabric to form a continuous reinforced flexible duct. Optionally, a narrower continuously extruded and wound scuff strip can be wound over the wire helix.

11 Claims, 8 Drawing Figures

REINFORCED FLEXIBLE DUCT WITH INTEGRAL MOLDED LINER

BACKGROUND OF THE INVENTION

This invention is directed to a reinforced flexible duct which has a continuous liner, as well as the machine and method for making the flexible duct.

There is a considerable body of prior art in flexible ducting or tubing. Single- or double-ply tubes are fabricated of a precoated fabric by winding, together with a wire helix. The precoated fabric is helically bonded to itself by solvent or adhesive bonding into one integral tube. Single-ply tubing is helically overlapped a single pitch, and the wire is wound into that overlap area to be captured between the coated fabric layers. A similar prior art construction is formed with a wider fabric which is almost two pitches wide so that two layers of fabric over or underlie the wire helix. Nearly the entire tube has three layers of fabric by this construction. Again, solvent or adhesive bonding is employed. In both of these structures, the coating on the fabric is a polymer composition material, such as polyvinyl chloride, which can be solvent-activated to adhere doing helical winding. The fabric is generally nylon, rayon, dacron, cotton, or fiberglass.

In another single-ply construction, during the winding the wire helix is encased with the single ply of fabric. This is accomplished by folding the fabric over the helical wire so that both edges extend in the same direction. Helical winding in the single-ply mode causes the area over the wire helix to have two layers thereon, with one fabric layer at some areas therebetween. This type of construction can also be formed in double-ply tubing by providing a wider fabric layer, one of which is almost two pitches wide, so that three layers of fabric are wound over the wire helix. This type of tubing construction also requires bonding with a compatible solvent or adhesive. The coating on the fabric can be either thermoplastic or elastomeric. Each of these structures has the disadvantage that it has a lap on the internal surface which is exposed to the fluids or solids passing through the duct. Thus, the duct must be installed with the overlap going with the flow of materials being handled. These laps increases air friction due to the exposed overlap edge. The chemical bonding, either by adhesive or solvent bonding, requires approximately 7 days for the solvent to completely disappear or the adhesive to fully cure so that full peel adhesion strength is achieved. Furthermore, chemicals wick through the fabric overlap to result in delamination and failure of the duct. The duct has poor abrasion resistance and cannot be used for liquid handling. There is a poor leakage rate due to the permeability of the material. Thus, there are considerable disadvantages to this design.

Another prior art design features sewn construction with a plastic liner being stitched to a single-ply, coated fabric layer with the helical wire captured between two rows of stitching. This construction has the disadvantage that the liner flaps are in the air flow and thus can be installed in only a certain way so that the liner flaps are directed downstream. This requires that the duct be marked on the outside. The construction is such that the duct has a poor bend radius and poor flexibility. There is poor external abrasion resistance, poor tensile strength, poor air friction loss, and since it is made by hand, it is expensive. Furthermore, it can be manufactured only in limited lengths. Thus, the sewn type of prior art construction is also disadvantageous so that there is a need for a reinforced flexible duct with integral molded liner.

SUMMARY OF THE INVENTION

In order to aid in the understanding of this invention, it can be stated in essentially summary form that it is directed to a reinforced flexible duct with an integral molded liner, together with a machine and method for making the duct. The duct comprises a continous helically wound structure of at least a fabric-reinforced coated layer, a wire helix, and a helically wound polymer composition layer, the fabric reinforcement layer and the polymer composition layer each being wider than one pitch of the helix so that overlap and adhesion occur with the polymer composition layer extending partway between the fabric-reinforced coated layer.

It is thus an object of this invention to provide a reinforced flexible duct with an integral molded liner. It is another object to provide a machine for manufacturing a reinforced flexible duct with an integral molded liner. It is a further object to provide a method for making a reinforced flexible duct with integral molded liner. It is still another object to provide a reinforced flexible duct which can be manufactured with an outer layer of polymer composition material and/or helically wound scuff band over the wire helix, with the entire structure thermoplastically fused together. It is still another object to provide a reinforced flexible duct with an integral molded liner which is of improved leakage resistance and abrasion resistance, both interiorly and exteriorly. It is a further object to provide such a duct which does not have exposed overlapping structure on the interior surface to provide a smooth bore line, which produces a duct of excellent air flow and a very low air friction loss. It is another object to provide a duct of such nature which has good resistance to chemical attack because the continuous lining prevents wicking of liquids through overlap areas. It is another object to provide a duct with liner which can be varied to suit the end use application, that is, provide a liner which is suitable for use with particular chemicals, food handling, abrasion resistance, and the like. It is a further object to provide a reinforced flexible duct which can be installed in either direction, without regard to fluid flow direction because the interior surface is smooth. It is a further object to provide such a duct which does not require chemical bonding or vulcanization and which can be manufactured in long lengths. It is a further object to provide such a duct which has excellent external abrasion resistance due to the applicability of cover layers or scuff strips. It is a further object to provide such a duct which is lightweight, has considerable flexibility, improved tensile strength, improved burst strength, of improved ply adhesion, and of low cost.

Other objects and advantages of this invention will become apparent from a study of the following portion of the specification, the claims, and the attached drawings.

DESCRIPTION OF THE SHOWN EMBODIMENT

Figure 1:
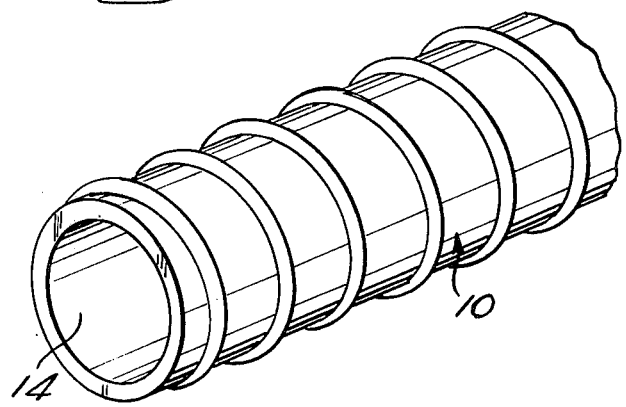
FIG. 1 is a perspective view of a reinforced flexible duct with integral molded liner, in accordance with this invention.
Figure 8:
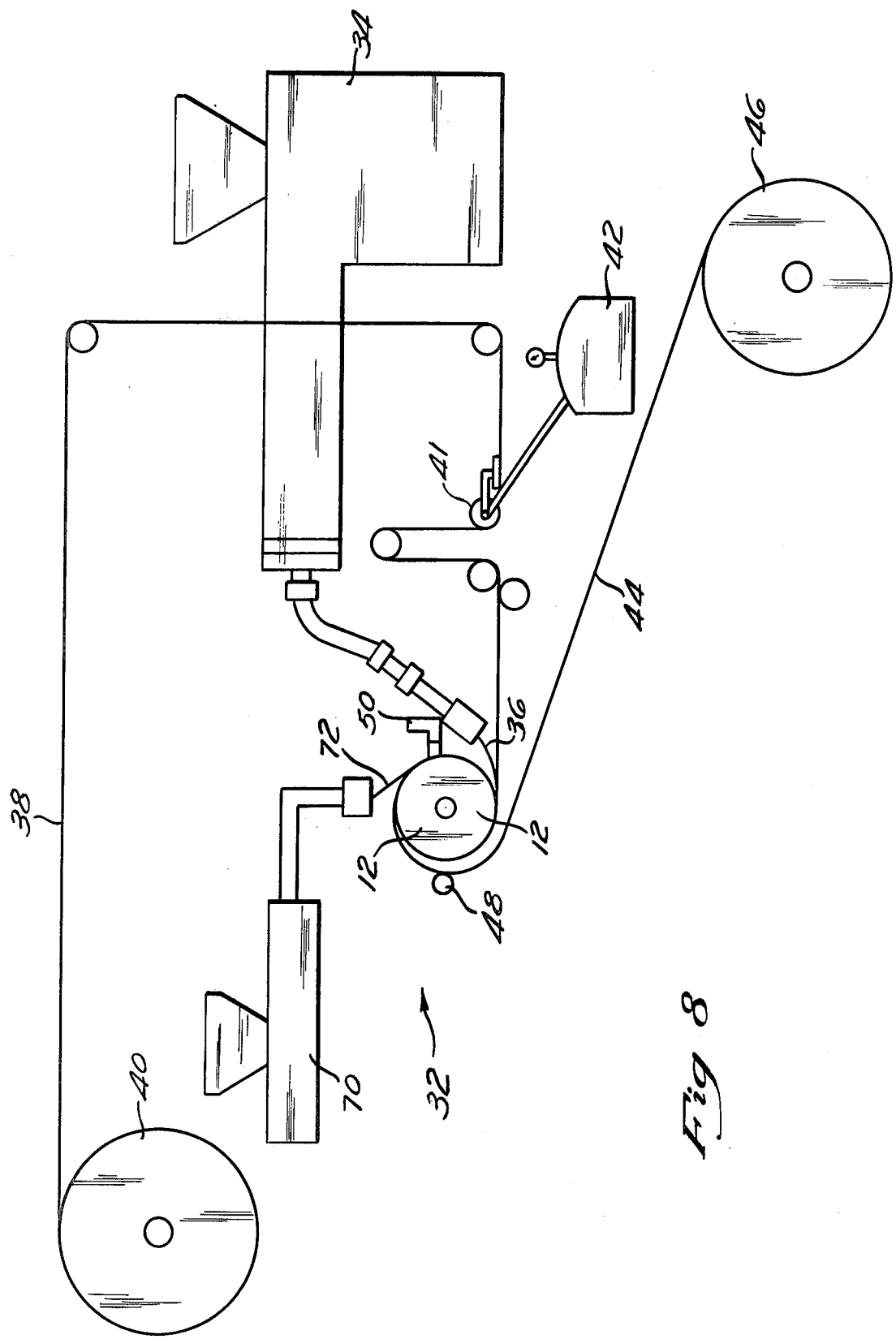
FIG. 8 is a schematic view of a machine for making the reinforced flexible duct with integral molded liner in accordance with this invention.

FIG. 1 illustrates duct 10 which is a reinforced flexible duct with an integral molded liner in accordance with this invention. FIG. 1 is a generalized view of the duct which can have several specific constructions, as is illustrated in FIGS. 2 through 7. These different constructions are related to the width of the extruded liner layer and the width of the reinforced fabric layer. In each case, the duct is formed on a mandrel 12, see FIG. 8, which is rotating in a clockwise direction with the duct spiralling toward the viewer, as seen in FIG. 8. In accordance with this invention, the duct 10 has a continuous thermoplastically molded liner 14 which has an interior surface which is continuous and smooth. The continuous character of the liner and its interior surface is achieved by extruding onto mandrel 12 a continuous thermoplastic layer which serves as the duct interior liner and is helically inter-wound with the reinforced fabric layer in order to bond all plys into one integral construction. Particular materials that serve as liner 14 are polyvinyl chloride, polyurethane, ethylene vinyl acetate, polypropylene, polyethylene, "Kynar" and other similar thermoplastic materials.

Figure 2:
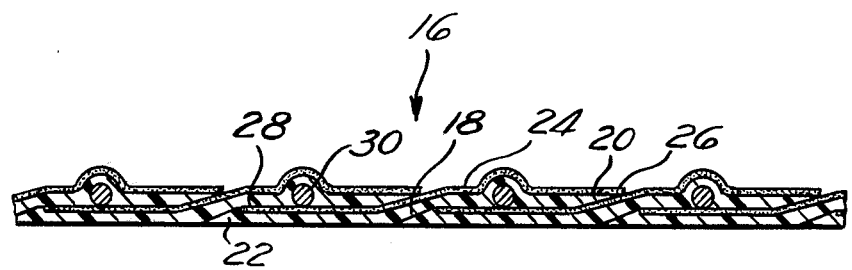
FIG. 2 is a section as seen along the section line of FIG. 1 wherein the duct is a single-ply reinforced duct with an integral molded liner.

Duct 16 of FIG. 2 is a single-ply reinforced duct with the integral molded liner. As a first step in making duct 16, liner layer 18 is extruded onto mandrel 12 from leading edge 20 to trailing edge 22. The leading half of liner layer 18 overlies that which has been previously helically wound on the mandrel, but approximately the latter half from about the center to the trailing edge 22 lies directly on the mandrel. After this spiral deposition of the liner material, coated fabric layer 24 is helically wound on. The fabric layer can have a fabric of nylon, polyester, fiberglass, "Kevlar", cotton, rayon, or other fabric materials. Furthermore, the fabric is coated with a thermoplastic which is compatible with the fabric and is compatible with the liner layer. Particular fabric coatings include polyvinyl chloride, polyurethane, ethylene vinyl acetate, polypropylene, polyethylene, "Kynar", and other similar thermoplastics. The coated fabric layer 24 is the reinforcement material of the duct and adds strength to the duct through the strength of the fabric therein. The reinforcement layer 24 is wound from a leading edge 26 which is even with or just ahead of leading edge 20 to trailing edge 28, which is ahead of trailing edge 22. If the liner layer 18 is not sufficiently tacky as a result of its recent thermoplastic deposition on the mandrel, then solvent can be applied to the coated fabric layer to aid in mutual solvent adhesion between the liner layer and the reinforcement layer. Thus, the reinforcement layer is bonded to the liner layer over its entire length. Since the trailing edge of liner layer 18 extends out from trailing edge 28, then the liner layer is positioned for attachement to and adhesion to the next turn of liner layer 18 as spiral deposition occurs.

After reinforcement layer 24 is applied, then helix wire 30 is wound into place on the trailing half of the coated fabric reinforcement layer 24. In this position, it will be next covered with the next helical turn of liner layer 18 and then with the leading half of the next helical turn of the coated fabric reinforcement layer 24. On the exterior of duct 16, the coated fabric reinforcement layers join to make a continuous attached fabric layer. On the interior, the succeeding helix windings of liner layer 18 and adhere and the liner becomes continuous and integral.

Defining the helical pitch of helix wire 30 as one pitch, then the width of the coated fabric layer 24 is slightly less than two pitches, while the width of liner layer 18 is slightly more than two pitches.

FIG. 8 shows a duct-making machine for making a duct with an integral molded liner such as duct 16 shown in FIG. 2. The machine has a belt mandrel shown schematically at 12 which rotates in the clockwise direction and moves the duct toward the viewer as it is being completed. The ductmaking machine is generally indicated at 32. Extruder 34 extrudes a wide, thin layer 36 of thermoplastic film onto the mandrel. This film becomes the liner film layer, which is shown as film layer 18 in FIG. 2. Coated fabric 38 is supplied in the appropriate width from roll 40. Solvent is applied to the coated fabric by solvent applicator 41 which can be a perforated guide roller supplied from solvent pot 42. After passing around conventional guide rollers, the solvent carrying coated fabric is wound onto the liner layer of film. Its positioning on the film layer has been discussed with respect to the type of duct shown in FIG. 2 and is described below with respect to other types of ducts. Coated fabric 38 is the fabric 24 shown in FIG. 2.

Wire 44 is supplied from wire spool 46 and is guided into position by guide roller 48 and pressure finger 50 which accurately locates the wire in both an axial and radial direction, pressing the wire down onto the fabric. As described above, in the next turn, the liner layer film overlies the wire and joins with the portion of the previous film helix which is exposed. The liner layer film also overlies the wire wound in the previous turn and overlies a portion of the fabric. The character of the freshly extruded liner layer film and the presence of the solvent make for adhesive attachment. The liner layer film extrusion is fused to itself and the coated fabric. The result is a very flexible tube with an excellent bend radius and a completely impermeable liner.

Figure 3:
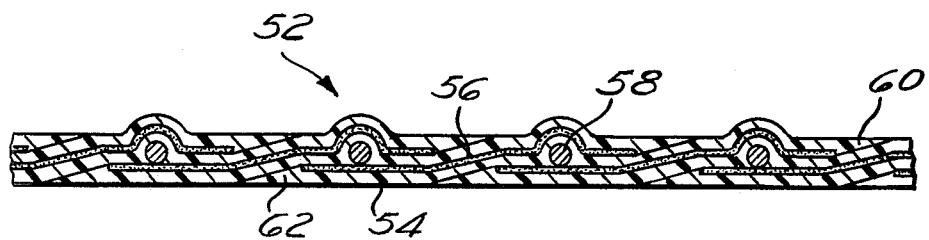
FIG. 3 is a section as seen generally along the section line of FIG. 1 of a single-ply reinforced flexible duct in accordance with this invention with an integral molded liner and cover.

Duct 52 in FIG. 3 is of similar construction to duct 16 of FIG. 2. Duct 52 also has liner layer 54, coated reinforcing fabric layer 56, and helix wire 58. Helix wire 58 is taken as defining the helical pitch. Again, the coated fabric layer is slightly less than two pitches in width, but in the present duct 52, liner layer 54 is slightly more than three pitches in width. The leading edge of the film in the turn identified in FIG. 3 is shown at 60, while the trailing edge is indicated at 62. At both the leading and trailing edges 60 and 62, layer 54 abuts against another portion of the liner layer at the next helical turn. Therefore, the entire outer surface, as well as the entire inner surface has a continuous extruded layer of thermoplastic polymer composition material. The leading and trailing edges are fused by the heat from the fresh extrusion, and in addition, there is solvent applied to the coated fabric reinforcing layer 56, which solvent acts to join the extruded layer to the reinforced layer and also provides enough solvent present at the leading and trailing edges to achieve solvent bonding there also, should the liner layer not be sufficiently tacky from the fresh extrusion process. Thus, duct 52 has a cover over the entire exterior of the tube for additional abrasion resistance. It has a single ply coated reinforcement with a continuous extruded liner and cover encasing the helix wire and the reinforcement fabric therein. The outer cover prevents penetration of water or other fluids during external exposure. The liner and the cover are fused together forming a homogeneous barrier and a completely impermeable liner.

Figure 4:
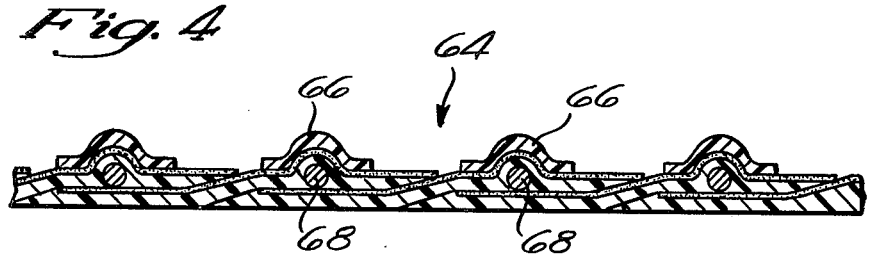
FIG. 4 is a view similar to FIG. 2 further including an integral molded scuff strip.

Duct 64 in FIG. 4 is of the same basic construction as duct 16 in FIG. 2. However, scuff strip 66 is extruded over the ridge caused by the presence of the helix wire 68 in duct 64. Scuff strip 66 permits the duct to be dragged along a surface without injury to the duct. Scuff strip 66 is applied by extruder 70, see FIG. 8, which extrudes scuff strip 72 into position. It attaches by thermoplastic tackiness.

Figure 5:
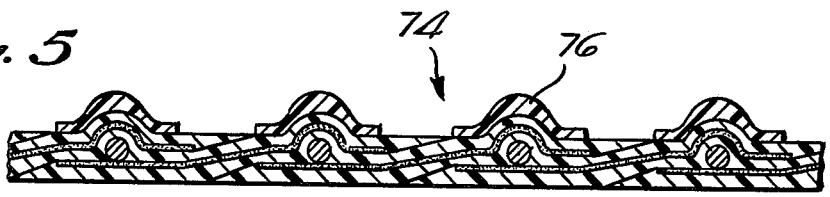
FIG. 5 is a view similar to FIG. 3 further including a molded scuff strip.

FIG. 5 shows duct 74 which has the same basic construction as duct 52 in FIG. 3. However, duct 74 carries the additional scuff strip 76 positioned over the rib formed by the presence of the wires in the helix. Like scuff strip 66, scuff strip 76 is applied by an extruder on a continuous basis and is adhered to the outer suface of the duct.

Figure 6:
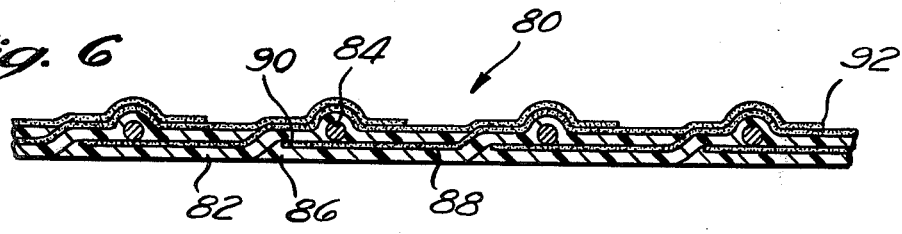
FIG. 6 is a section through a flexible duct, as seen generally along the section line of FIG. 1, wherein the duct is a double-ply reinforced flexible duct with an integral molded liner.
Figure 7:
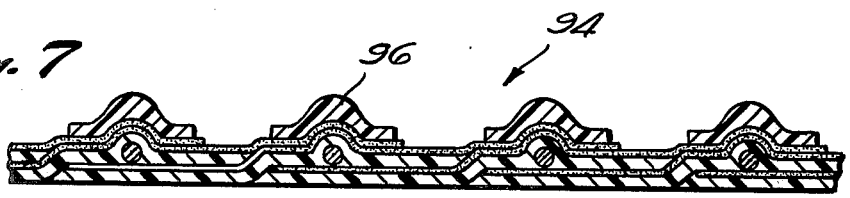
FIG. 7 is a view similar to FIG. 6 showing that type of duct further including a molded scuff strip.

Duct 80 shown in FIG. 6 is of the same general construction. It has a continuously extruded liner layer 82 which has a width along the direction of the duct axis of slightly more than two pitches of helix wire 84. The winding of liner layer 82 is again such that its trailing edge 86 of the previous helical turn engages intermediate the edges of the latest helical turn. As in the previously described duct construction, the liner layer adheres to itself at these helical edges. Adherence is accomplished either by the character and tackiness of the material as it is freshly extruded and/or by the application of solvent or adhesive. However, these are applied in minimum amounts to permit rapid drying of the structure.

Coated reinforcing fabric layer 88 is about 2⅜ pitches wide. Its trailing edge 90 is positioned almost even but slightly forward of trailing edge 86 of the liner layer. In view of the fact that reinforcing layer 88 is more than 2 pitches in width, then there are at least two sets of reinforcing fabric layers at any point in the wall of the duct. Leading edge 92 is forward of the helix wire 84 two helical turns in the leading direction. This results in two layers of the fabric over each of the helix wires. The result is two piles of the coated reinforcement fabric throughout the entire duct, a wire helix, and a continuous bonded polymer composition liner. The two-ply reinforcement increases the burst strength pressure and tensile properties. The duct is still flexible, but somewhat stiffer than the single-ply construction. Duct 80 also has improved puncture resistance.

Duct 94 is of the same two reinforcing fabric ply construction as the duct 80, but it additionally has scuff strip 96 continuously extruded and adhesively attached over the ridges formed by the helix wire.

In every case, the duct is produced by proper control of the width of the reinforcement fabric and the width of the extruded polymer composition liner layer, together with their correct widthwise positioning with respect to each other in the axial direction of the duct. The liner layer must be at least one pitch in width. The trailing edge of the extruded liner layer must not be completely covered by the fabric, but must be exposed at the edge so that, when the next helical layer of the liner material is wound on, then the successive windings of that layer lie against each other so that they can fuse together, with or without the aid of a solvent adhesive. The polymer composition material extruded into the liner layer as well as the coating on the fabric and any solvent adhesive used must by mutually compatible so that adhesion exists between the liner layer and the reinforced fabric layer. The same considerations apply to the application of the scuff strip, which must adhere to the outer surface of the duct by adhesion which results from solvent adhesive or by the tackiness of the scuff strip as it is extruded into place.

As the continuous extrusion and helical winding of the duct take place, it is cut to desired length. The result is a continuous extruded liner fused and adhered to the coated fabric to form an impervious barrier. The liner barrier prevents leakage through the duct wall. It also provides excellent abrasion resistance on the interior which exposed to solid abrasive materials carried in the fluid stream. The smooth bore liner construction provides very low air friction loss and excellent air flow. The absence of exposed overlap surfaces on the interior of the tube permit the duct to be installed in either direction without regard to the direction of fluid flow. In view of the selectibility of the liner material, it can be selected for use with different materials to be conveyed, including different chemicals, food types and materials with abrasive characteristics. The employment of a cover or scuff strip improves the external abrasion resistance characteristics.

The continuous manufacturing process makes for a lower cost construction in which chemical bonding and/or vulcanization is not required. It can be manufactured in long lengths, depending upon the capability of handling the output product. The continuous character of the manufacturing improves ply adhesion by employment of a minimum of solvent adhesives, by reason of the fresh extrusion of the liner layer. This permits prompt discharge of the solvent and early strength. The particular design incorporating the continuous extruded liner results in a lightweight, flexible stock of improved tensile strength and improved burst strength. The result is a duct of superior characteristics.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. A reinforced duct comprising, a helically wound member defining a pitch, a helically wound internal liner layer having a width in the axial direction of said duct greater than one pitch length, said liner layer being of polymer composition material, a helically wound web of fabric material overlying a portion of said liner layer and leaving a trailing edge margin of the liner layer convolutions uncovered by said web, successive convolutions of said liner layer overlapping and adhered to said uncovered trailing edge margin, said web having a width in the axial direction of said duct greater than one pitch length, said helical member overlying said web, said liner layer and said overlapping relationship of successive convolutions thereof providing a continuous smooth bore for said duct.

2. The duct of claim 1, wherein a portion of the width of said liner layer is positioned between overlapping portions of said web.

3. The duct of claim 2 wherein the width of said liner layer is at least two pitches so that said liner layer acts as an interior liner for one pitch and said liner layer lies between layers of said web for substantially one pitch.

4. The duct of claim 2 wherein said liner layer is more than one pitch in width greater than the width of said web and said liner layer is positioned to form both a continuous inner liner and a continuous exterior cover for said duct, with said web lying between successive helical turns of said liner layer.

5. The duct of claim 1 wherein said liner layer is a thermoplastic polymer composition material and said web is at least coated with an adhesively compatible polymer composition material, said liner layer and said web being adhesively attached to each other.

6. The duct of claim 3 wherein said liner layer is a thermoplastic polymer composition material and said web is at least coated with an adhesively compatible polymer composition material, said liner layer and said web being adhesively attached to each other.

7. The duct of claim 4 wherein said liner layer is a thermoplastic polymer composition material and said web is at least coated with an adhesively compatible polymer composition material, said liner layer and said web being adhesively attached to each other.

8. The duct of claim 7 further including a helically positioned thermoplastic scuff strip positioned over said helical member.

9. The duct of claim 3 further including a helically positioned thermoplastic scuff strip positioned over said helical member.

10. The duct of claim 9 wherein said helical member is a metallic spring wire.

11. The duct of claim 1 wherein said helical member is a metallic spring wire.

* * * * *